United States Patent

[11] 3,577,024

[72] Inventors Junpei Inagaki;
Moriyoshi Sakamoto, Yokohama-shi;
Tsuneo Nakaita, Kawasaki-shi; Hiroyuki
Kitamura, Yokohama-shi, Japan
[21] Appl. No. 861,602
[22] Filed Sept. 29, 1969
[45] Patented May 4, 1971
[73] Assignee Tokyo Shibaura Electric Co., Ltd.
Kawasaki-shi, Japan
[32] Priority Oct. 1, 1968
[33] Japan
[31] 43/70872

[54] LIQUID-COOLED DYNAMOELECTRIC MACHINES
1 Claim, 3 Drawing Figs.
[52] U.S. Cl. .................................................... 310/54,
310/61
[51] Int. Cl. ..................................................... H02k 9/19

[50] Field of Search .......................................... 310/54, 57,
59, 60, 64, 68, 168, 263, 63, 265

[56] References Cited
UNITED STATES PATENTS
2,987,637  6/1961  Bertsche et al. ............. 310/54
2,991,380  7/1961  Pfleger ........................ 310/265X

*Primary Examiner*—D. F. Duggan
*Attorney*—Flynn & Frishauf

ABSTRACT: In a liquid-cooled dynamoelectric machine comprising a stator, a rotor, and means to spray cooling liquid directly upon heated portions of the stator, the peripheral surface of the rotor is provided with a pair of oppositely directed helical grooves or a pair of oppositely inclined surfaces to create components of force which act to prevent the cooling liquid from entering into the airgap between the stator and the rotor.

LIQUID-COOLED DYNAMOELECTRIC MACHINES

This invention relates to a dynamoelectric machine of the type wherein cooling liquid is sprayed directly upon high temperature portions of the machine.

In the prior art liquid-cooled dynamoelectric machines as the cooling liquid is circulated through a cooling pipe or tank the cooling efficiency of the liquid is poor, so that efficient cooling effect can not be expected.

In order to provide efficient cooling effect without lowering the cooling efficiency it is advantageous to spray the cooling liquid directly upon heated portions of the machine such as end turns of the armature winding of the stator. However, with such a method of cooling, the cooling liquid enters into the airgap between the rotor and stator to create an extremely large frictional loss. For this reason, the method of cooling the dynamoelectric machine by spraying the cooling liquid directly upon heated portions is scarcely used.

Certain types of dynamoelectric machines, for example, electric motors for driving electric cars are required to be of small size, lightweight and can operate at very high speeds. In addition, in order to decrease weight to output ratio of the machine to less than 1 kg./hp. like internal combustion engines and to pass large armature currents to increase the torque more than 200 percent when the cars go up slopes, it is highly desirable to provide efficient cooling means.

According to a prior proposal the rotor is completely surrounded by a stationary nonmagnetic cylinder which is secured to the inner bore of the stator core. Although such a cylinder can effectively seal the airgap against the cooling liquid, it is not only expensive but also increases the radial length of the airgap, thus requiring more field ampere turns.

It is an object of this invention to provide an improved liquid-cooled dynamoelectric machine which can efficiently prevent the cooling liquid from entering the airgap by simple means.

Another object of this invention is to provide a liquid-cooled dynamoelectric machine which can prevent eddy current loss on the periphery of the rotor.

SUMMARY OF THE INVENTION

According to this invention, a pair of oppositely directed helical grooves are formed on the peripheral surface of the rotor. The inclined surfaces and walls of the helical grooves create components of forces tending to push back the cooling liquid entering into the airgap. Helical grooves are also effective to decrease eddy current loss on the rotor surface.

The invention can be more fully understood from the following description when taken in conjunction with the accompanying drawings, in which.

Figure 1:
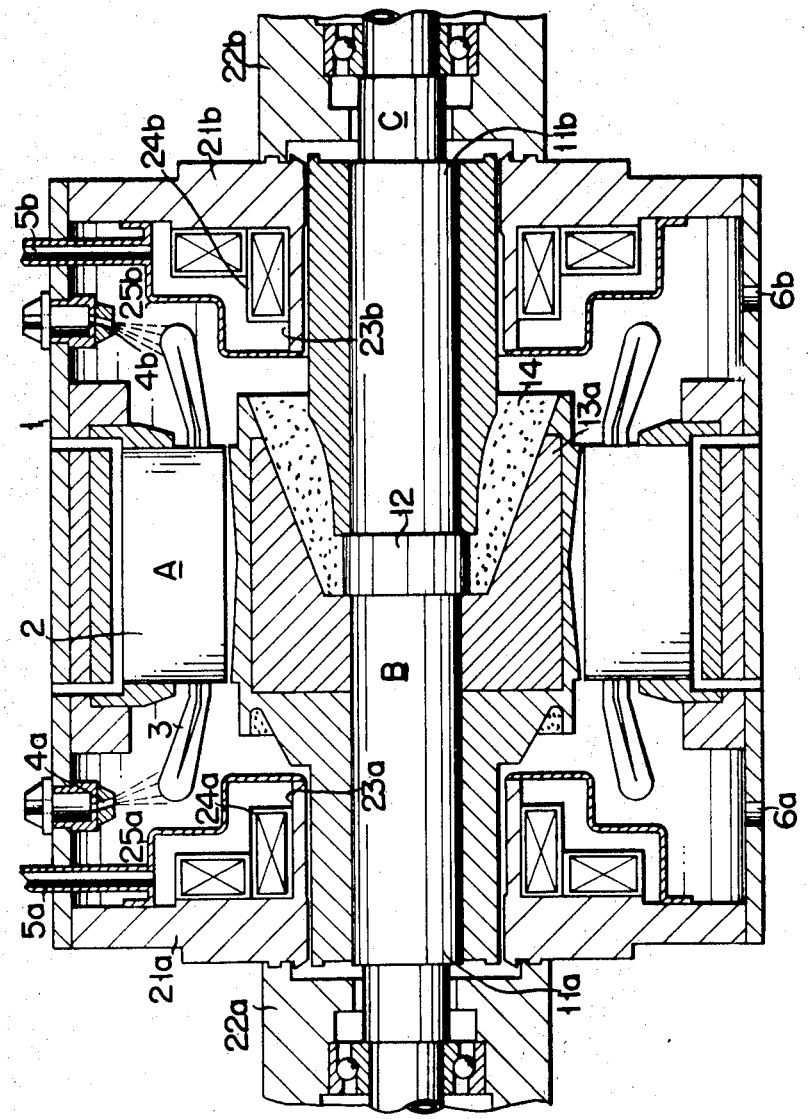
FIG. 1 is a longitudinal sectional view of a liquid-cooled dynamoelectric machine.

Referring now to the accompanying drawings illustrating a comb-shaped pole-type synchronous machine embodying this invention, the machine comprises a stator A, a rotor B and a shaft C.

The stator A comprises an armature core 2 secured to the inner surface of a cylindrical frame 1 and an armature winding 3 contained in slots of the armature core 2. The armature winding 3 is treated with a liquidtight varnish. Nozzles 4a and 4b for spraying the cooling liquid directly upon end turns of the armature winding 3 are provided to extend through the upper wall of the casing 1.

The shaft C is divided into two axially aligned sections 11a and 11b which are coupled together by means of a nonmagnetic intermediate shaft 12. The rotor B includes a pair of opposing comb-shaped magnetic poles 13a and 13b (in the drawing poles 13b are not seen) which are interleaved each other with definite gaps therebetween. The gaps are filled with a nonmagnetic material 14, die-casted aluminum for example, to provide a substantially solid cylindrical rotor.

The bearing member C comprises ball bearings contained in bearing brackets 22a and 22b secured to the outside of end brackets 21a and 21b on the opposite ends of the frame 1.

Field coils 24a and 24b are wound axial projections 23a and 23b provided on the inside of the end brackets 21a and 21b. Field coils 24a and 24b are surrounded by annular casings 25a and 25b through which is circulated a suitable cooling liquid such as oil via conduits 5a and 5b extending through the upper wall of the cylindrical frame 1.

Figure 2:
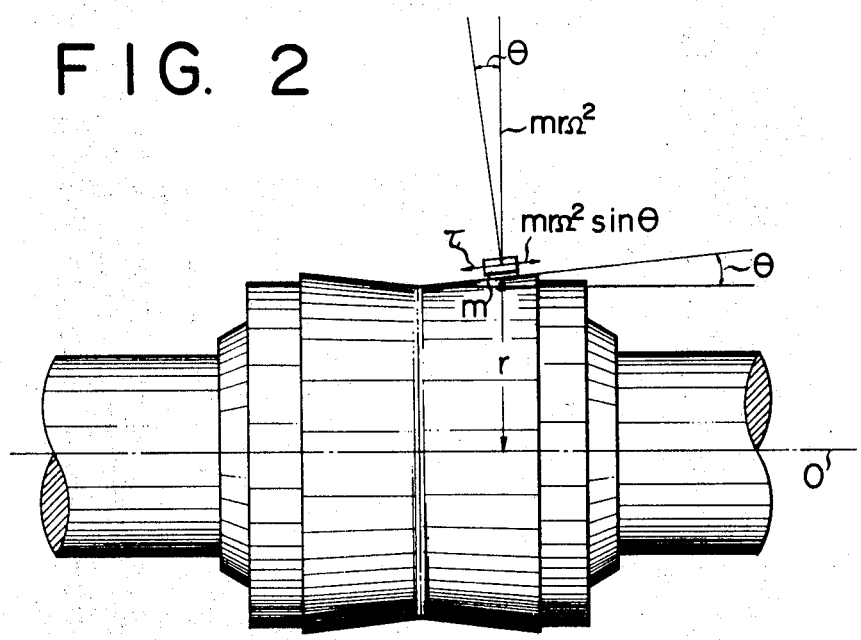
FIG. 2 is a diagrammatic side view of the rotor of the dynamoelectric machine shown in FIG. 1.

As best shown in FIG. 2, the diameter of the rotor is made slightly smaller at the axial center than at opposite ends. Thus, outer surfaces of the rotor on the opposite sides of the center are inclined by an angle $\Theta$ with respect to the horizontal. Thus, the radial distance $\Gamma$ of the rotor surface from the longitudinal axis $0$ of the rotor gradually increases from the center toward opposite ends.

In operation, field coils 24a and 24b are cooled by the cooling liquid circulating through annular casings 25a and 25b and the armature winding 3 is cooled by the cooling liquid sprayed from nozzles 4a and 4b directly upon end turns. The cooling liquid flows downwardly around the end turns to efficiently cool the armature winding. The spent cooling liquid is drained through discharge ports 6a and 6b at the bottom of the frame 1.

The cooling liquid sprayed onto the armature winding tends to flow into the airgap between the stator and the rotor. However, as has been pointed out hereinbefore the outer periphery of the rotor is slightly inclined from the center toward the opposite ends, such invasion of the cooling liquid is opposed by the centrifugal force of the rotor. More specifically, considering a liquid particle m, where a component $mr\Omega^2 \sin \Theta$ of the centrifugal force $mr\Omega^2 \sin \Theta$ of the centrifugal force $mr\Omega^2$ is equal to the viscosity resistance $$\tau = \mu \frac{d\mu}{dt}$$

of the liquid, the liquid particle m does not move. However, as the peripheral speed $\Omega$ of the rotor is increased to satisfy a relation $mr\Omega^2 \sin \Theta > \tau$, then said component of the centrifugal force will push the liquid particle m back to the opposite ends of the rotor. By suitably selecting the inclination angle $\Theta$ of the rotor peripheral surface in accordance with the speed of the motor, the cooling liquid will never enter into the airgap under normal operating conditions. In ultrahigh speed motors such as the comb-shaped pole-type synchronous machine shown in this embodiment and operating at a speed of about 20,000 r.p.m. the angle of inclination may be very small so that provision of such an inclined surface does not affect the performance of the machine to any appreciable extent.

Figure 3:
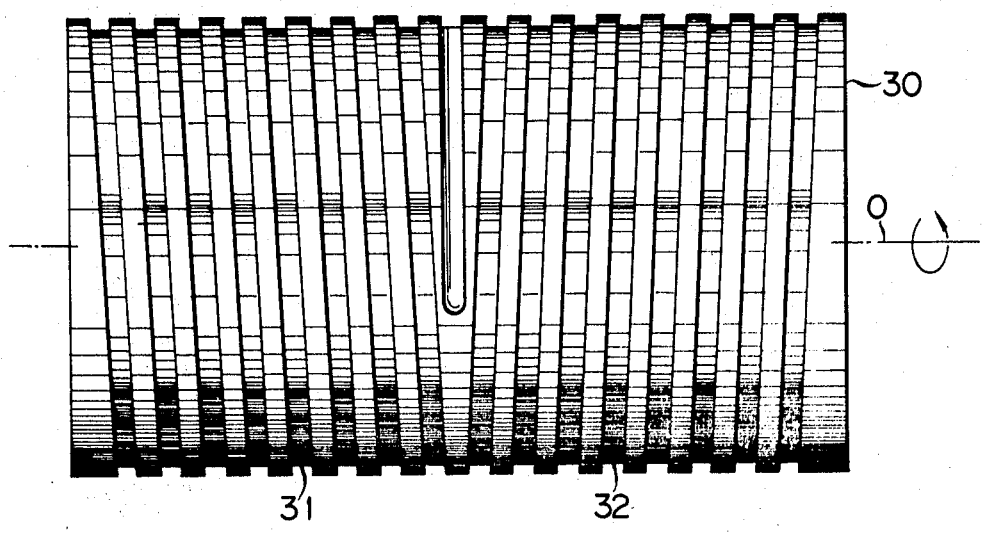
FIG. 3 shows a side view of a modified rotor constructed according to the teaching of this invention.

According to a modified embodiment of this invention shown in FIG. 3, the peripheral surface of a rotor 30 which may be of the similar construction as that shown in FIG. 1 is formed with oppositely directed symmetrical helical grooves 31 and 32 extending from the center to the opposite ends of the rotor. The inclined walls of the helical grooves generate components of forces tending to push the cooling liquid entering into the airgap back to the opposite ends of the rotor. In other words, these helical grooves act as screw pumps. As the direction of the rotation of the motor is reversed, helical grooves tend to push such cooling liquid into the airgap. Accordingly, the direction of the inclination of helical grooves should be predetermined in accordance with the direction of rotation of the rotor. Even in electric cars it is usual to utilize a torque converter and a gear train to change the speed and direction of running. Accordingly, the driving motor may rotate in one direction only just like an internal combustion engine.

Further, the helical groove is effective to greatly decrease eddy current loss and hence heating caused thereby which are inherent to induction machines and solid rotors as in the case of the comb shaped pole rotors. Thus, the efficiency of the machine can be greatly improved.

In this manner, this invention provides an improved liquid-cooled dynamoelectric machine in which cooling liquid is sprayed directly upon high temperature portions of the machine and yet the cooling liquid is efficiently prevented from entering into the airgap by simple means, thus preventing large frictional loss in the air gap.

We claim:

1. In a liquid-cooled dynamoelectric machine comprising a stator, a rotor, an airgap formed between said stator and said rotor, and means to spray-cooling liquid directly upon high temperature portions of said stator, the improvement which comprises a pair of oppositely directed helical grooves provided on the peripheral surface of said rotor, each of said helical grooves extending from the axial center to one end of said rotor, to thereby create a component of force which prevents said cooling liquid from entering into the airgap between said stator and rotor when said rotor rotates.

UNITED STATES PATENT OFFICE
CERTIFICATE OF CORRECTION

Patent No. 3,577,024            Dated May 4, 1971

Inventor(s) Junpei Inagaki et al.

It is certified that error appears in the above-identified patent and that said Letters Patent are hereby corrected as shown below:

On the cover sheet [31] before "43/70872" insert -- 43/70869 and --.

Signed and sealed this 17th day of August 1971.

(SEAL)
Attest:

EDWARD M. FLETCHER, JR.            WILLIAM E. SCHUYLER, JR.
Attesting Officer                      Commissioner of Patents

UNITED STATES PATENT OFFICE
CERTIFICATE OF CORRECTION

Patent No. 3,577.024  Dated May 4, 1971

Inventor(s) Junpei Inagaki et al.

It is certified that error appears in the above-identified patent and that said Letters Patent are hereby corrected as shown below:

On the cover sheet [31], "43/70872" should read -- 43/70869 and 43/70872 --.

This certificate supersedes Certificate of Correction issued August 17, 1971.

Signed and sealed this 30th day of May 1972.

(SEAL)
Attest:

EDWARD M. FLETCHER, JR.
Attesting Officer

ROBERT GOTTSCHALK
Commissioner of Patents